United States Patent [19]
Pillans

[11] Patent Number: 5,644,728
[45] Date of Patent: Jul. 1, 1997

[54] CONTROL SYSTEMS

[75] Inventor: Andrew R. Pillans, Dundee, Scotland

[73] Assignee: NCR Corporation, Dayton, Ohio

[21] Appl. No.: 493,658

[22] Filed: Jun. 22, 1995

[30] Foreign Application Priority Data

Feb. 14, 1995 [GB] United Kingdom ............... 9502819

[51] Int. Cl.⁶ .................................................. G06F 19/00
[52] U.S. Cl. ............................................................ 395/243
[58] Field of Search .................................. 395/243, 242,
395/244, 237, 235, 333, 334, 335, 349,
967, 710, 706, 707, 703, 702; 364/192,
191

[56] References Cited

U.S. PATENT DOCUMENTS

| 4,809,170 | 2/1989 | Leblang et al. | 395/703 |
|---|---|---|---|
| 4,860,204 | 8/1989 | Gendron et al. | 395/702 |
| 4,914,568 | 4/1990 | Kodosky et al. | 395/967 |
| 4,974,160 | 11/1990 | Bone et al. | 364/191 |
| 5,019,961 | 5/1991 | Addesso et al. | 364/192 |
| 5,134,560 | 7/1992 | Ferriter et al. | 395/349 |
| 5,291,587 | 3/1994 | Kodosky et al. | 395/333 |
| 5,295,062 | 3/1994 | Fukushima | 395/349 |
| 5,297,250 | 3/1994 | Leroy et al. | 395/333 |
| 5,301,301 | 4/1994 | Kodosky et al. | 395/967 |
| 5,312,478 | 5/1994 | Reed et al. | 395/335 |
| 5,321,610 | 6/1994 | Breslin | 395/209 |
| 5,321,803 | 6/1994 | Ditter, Jr. | 395/335 |
| 5,325,481 | 6/1994 | Hunt | 395/334 |
| 5,327,529 | 7/1994 | Fults et al. | 395/335 |
| 5,339,392 | 8/1994 | Risberg et al. | 395/333 |
| 5,420,978 | 5/1995 | Tozawa et al. | 395/334 |
| 5,430,873 | 7/1995 | Abe et al. | 395/710 |
| 5,500,800 | 3/1996 | Talbott | 364/468.05 |
| 5,517,663 | 5/1996 | Kahn | 395/967 |
| 5,551,041 | 8/1996 | Beethe | 395/967 |
| 5,602,997 | 2/1997 | Carpenter et al. | 395/335 |

Primary Examiner—Donald E. McElheny, Jr.
Attorney, Agent, or Firm—Michael Chan

[57] ABSTRACT

A system for generating a control program for a target apparatus, the system comprising: a processor; a visual display unit; an input device; a program store; and a control program data store; the program store containing: an editor program for controlling the processor to accept input from the input device to modify the contents of the control program data store; a display program for controlling the processor to display a graphical representation of the contents of the control program data store on the visual display unit; and a compiler program for generating said control program from the contents of the control program data store; wherein the editor program is arranged to store control program data defining groups of sub programs for simultaneous execution on said target apparatus and control flow data defining a sequence of execution of said groups, the edit program permitting a plurality of sub programs in a group; and wherein the display program is arranged to generate a display graphically representing said sub programs so as to indicate said groups, and control flows corresponding to said control flow data between said groups.

37 Claims, 13 Drawing Sheets

CONTROL SYSTEMS

BACKGROUND OF THE INVENTION

This invention relates to apparatus for the manufacture of control systems, and in particular control systems for self-service automatic apparatus such as automated teller machines (ATMs).

As is well known, such ATMs comprise a card reader for reading a card; a banknote store for dispensing banknotes; input and output devices such as a keypad and screen; and a control device such as a microprocessor controlling operation of the foregoing components.

These elements of an ATM are widely used. The basic control operations performed by the microprocessor for receiving a card, reading the card, rejecting the card, accepting a key input, displaying a screen, and so forth are similar in many different systems using ATMs. However, the data shown on the screen differs depending upon the identity of the system in which the ATM machines are employed. Furthermore, in different systems, the basic operations of controlling the devices which make up the ATM machine may be required to be performed in different sequences.

Thus, hitherto, when a new ATM system is to be installed, the prospective owner of the system specifies the functions which the system must perform, and a control program for the microprocessor control unit on each ATM machine is written by a computer programming expert, making use (where possible) of existing subroutines for particular low level device control operations.

An object of the present invention is to provide a system for developing new control program systems (e.g. for an ATM) in which the role of the computer expert is reduced and the role of the prospective user, or the expert in the business area of the prospective user, is increased.

A control program development application called 'Icon Author' is known. This application provides a graphical user interface (GUI) which allows a control program to be specified as a flow diagram, consisting of a number of icons (i.e. subimages) each representing a processing subprogram or subroutine or a control structure, linked by lines indicating the control flow from subroutine to subroutine.

A major drawback with that system, however, is that it is designed to specify only sequential operations (as is usual with flow diagrams). For ATMs or similar applications, several subroutines may in fact be required to be executing concurrently; for example, a screen displaying alternating messages may be operating concurrently with a routine controlling a card reader to scan for the insertion of card.

This problem can be overcome in the Icon Author system or similar systems by writing subroutines which actually concurrently perform two tasks. However, this solution leads to subroutines which are complex, and tend to be specific to one particular system, since in different systems different processes may be required to execute concurrently.

It can alternatively be overcome by breaking down subroutines into much smaller parts. However, this makes the structure of the application harder to understand to the non-expert, and also makes reuse more difficult.

SUMMARY OF THE INVENTION

In one aspect, the present invention therefore consists of a system for generating a control program which provides a visual interface to the system user, the visual interface representing, and allowing editing of: subimages representing control processes, the processes being grouped to represent a plurality of processes which are to be concurrently executed; and links between the subimages representing control flow from one group of concurrent processes to a successively performed group of concurrent processes.

BRIEF DESCRIPTION OF THE DRAWINGS

The invention will now be illustrated by way of example only, with reference to the accompanying drawings in which;

FIG. 7b is a flow diagram illustrating schematically a part of the process of FIG. 7a;

DETAILED DESCRIPTION

Figure 1:
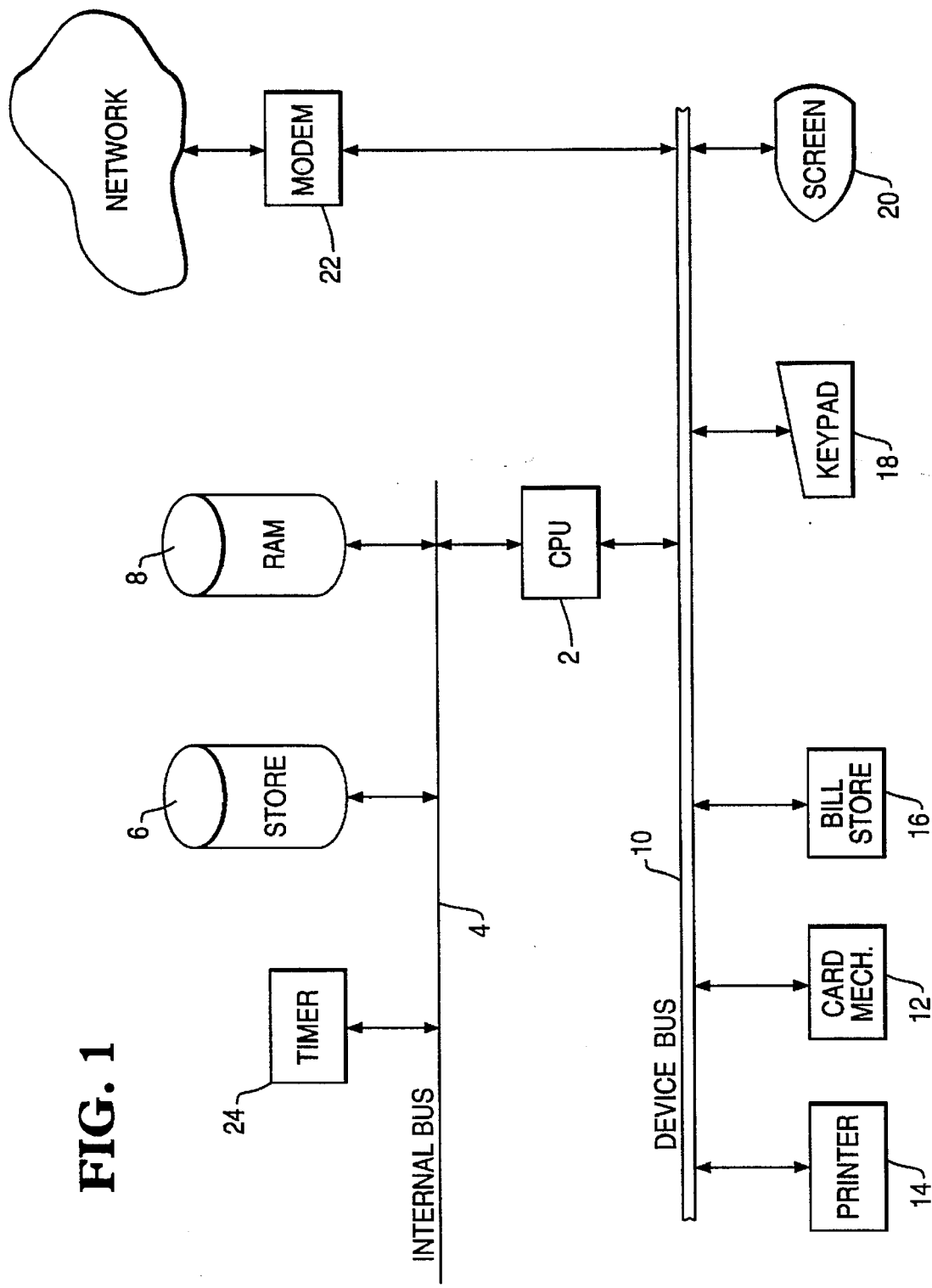
FIG. 1 is a block diagram illustrating the components of a conventional ATM machine.

By way of background, the structure of a conventional ATM machine will briefly be disclosed with reference to FIG. 1. The ATM comprises a central processor unit (CPU) 2 coupled via an internal bus 4 to a store (e.g. disk drive, or EPROM) 6 storing the control program controlling the operation of the CPU 2, and a random access memory (RAM) 8 for storing working data during operation of the CPU 2.

The CPU 2 is also connected to a device bus 10, via which it communicates with a card mechanism 12 for receiving, reading and ejecting a card (e.g. a magnetic stripe card); a printer 14 for printing receipts or balances; a banknote store and dispenser 16 storing one or more banknote denominations and selectively dispensing required numbers of banknotes; a key pad 18 (or other touch responsive input device); and a display screen 20 for displaying messages.

A modem 22 is also provided, for performing validation transactions via a telecommunications network.

Also provided is a timer 24 (e.g. a programmable counter-timer integrated circuit).

The operation of the ATM of FIG. 1 depends upon the control program within the store 6. The control program typically comprises a conventional operating system (such as the OS/2 operating system) arranged to handle low level input and output, and an applications program which is specific to the particular system within which the ATM resides. For example, one general sequence of operation might be:

await insertion of card, whilst displaying messages, accept card and read identity data, input PIN number via keyboard, whilst displaying instruction screen for user, transmit identity and PIN data via modem for validation and await reply, display screen indicating transaction choices and input desired transaction, if validation not accepted, reject card and return to the beginning, if validation successful, perform transaction (i.e. either read and display or print balance, or input desired amount of cash and dispense from bill store), return card.

At various points during the transaction, message screens instructing or informing the user are displayed; communications are performed via the network; data is input via the keyboard; time intervals between successive user operations are timed (and operations are terminated after a time out); and so on. These elements determine the behaviour of the ATM machine to the customer using its services.

Figure 2:
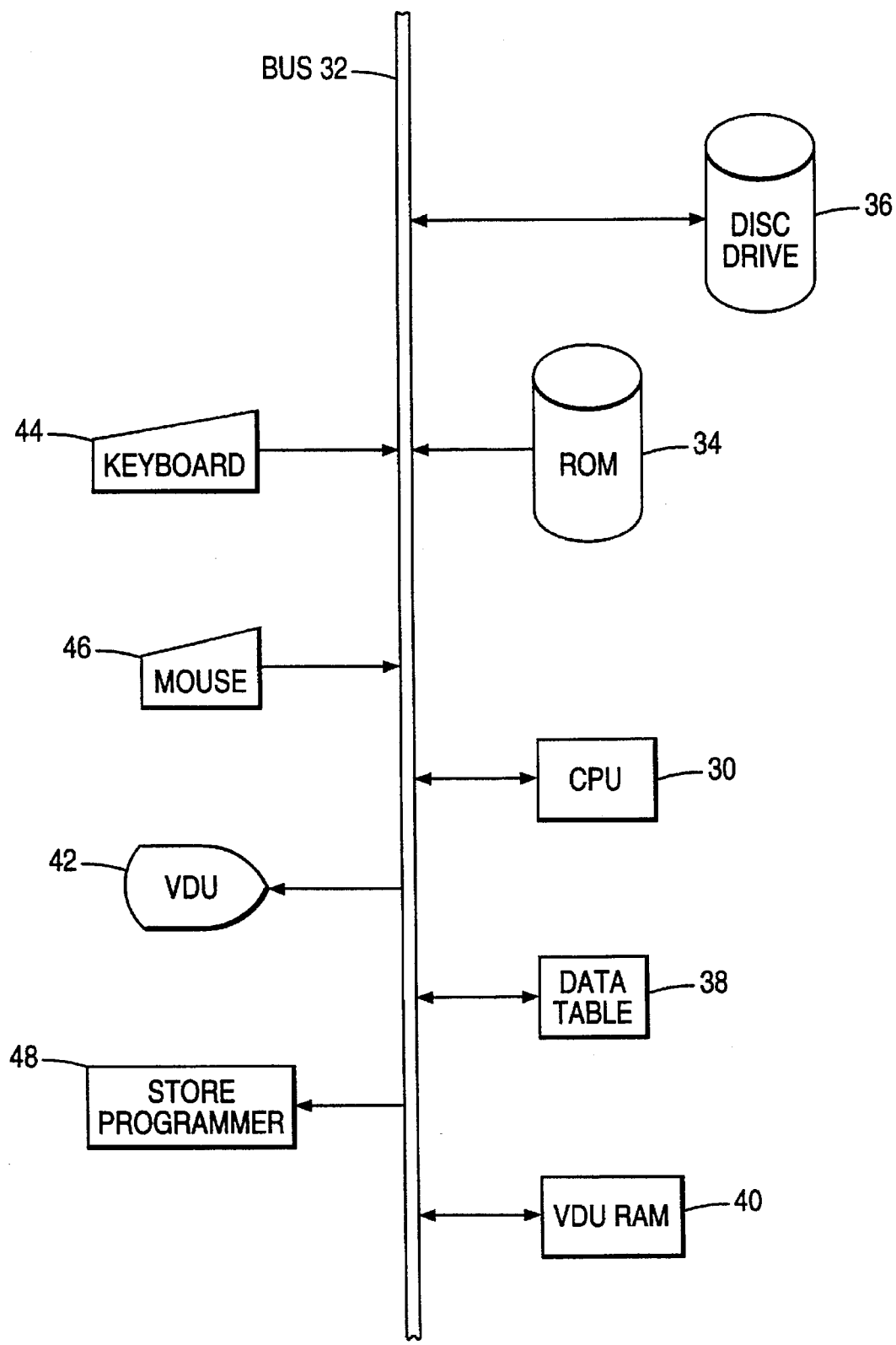
FIG. 2 is a block diagram illustrating the components of a control program development system in one embodiment of the present invention.

Referring to FIG. 2, a control program development system according to a preferred embodiment of the invention will now be disclosed.

The system comprises a CPU 30; a system bus 32, via which the CPU 30 communicates with a read only memory 34 containing an operating system (or part thereof); a disk drive 36 (e.g. a hard disk drive) containing a program for operating the CPU 30 according to the invention; a random access memory storing a data table 38; a visual display unit random access memory 40 comprising an image buffer; a visual display unit 42; a keyboard 44 for text or numerical input; and a mouse 46 (or other graphical input device such as a track ball, light pen, touch screen, or digitiser tablet and stylus). These elements may be provided by a computer work station.

Also provided in this embodiment is a target store programmer 48 (e.g. a disk drive or EPROM programmer).

Figure 3:
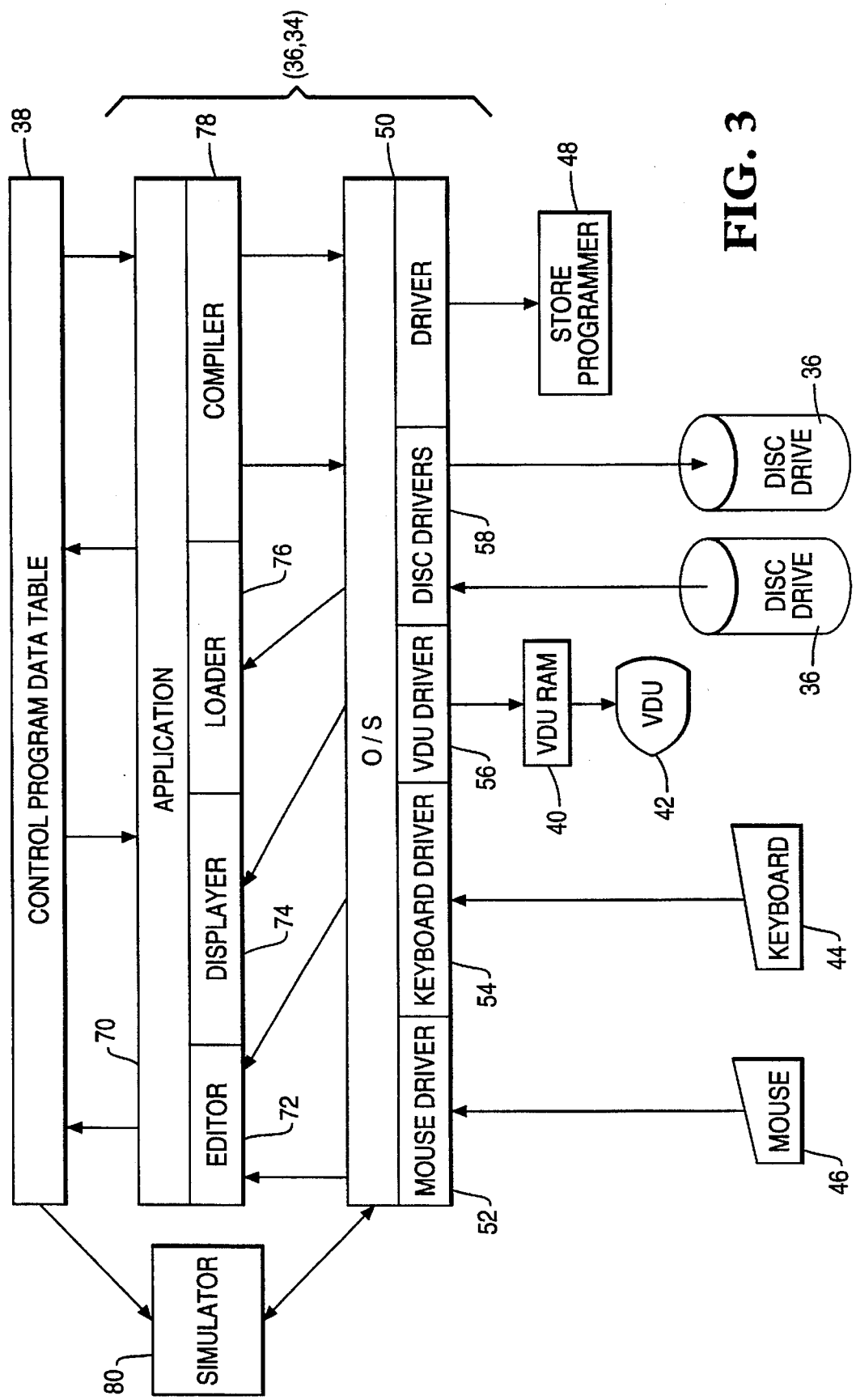
FIG. 3 is a diagram illustrating the flow of data in the embodiment of FIG. 2.

An overview of the operation of the system of FIG. 2 will now be given with reference to FIG. 3. In FIG. 3, the numeral 50 denotes a representation of the operating system program, contained on the hard disk within disk drive 36 (except for a kernel on the read only memory 34), comprising, inter alia, a mouse driver 52 for processing input signals from mouse 46 to provide control event signals; a keyboard driver 54 for processing likewise input signals from the keyboard 44; a VDU driver program 56 for supplying display data to the image buffer 40 from which the VDU 42 is refreshed; and disk driver routines 58 for reading and writing data to and from disk drives 36. The operating system 50 preferably comprises a graphical user interface (GUI) system, and may for example comprise the OS/2 operating system or the Windows (TM) environment available from Microsoft Inc.

Stored within the random access memory is a table 38 storing data from which the control program will be generated. The table 38 will be described in greater detail below.

Stored on the hard disk within the disk drive 36 is an applications program 70 controlling the CPU 30, and consisting of an editor routine 72 accepting data from the mouse driver and keyboard driver (52,54) via the operating system 50 and responsively amending the data in the table 38; a display routine 74 periodically generating and updating data defining a display on the VDU 42 representing the contents of the table 38, and passing the display data to the operating system 50; a loader routine 76 reading pre-stored data from the disk drive 36 for loading into the table 38; and a compiler 78 arranged to read the data from the table 38, and provide a machine language program in the language of the CPU 2 of the ATM of FIG. 1, for supply (via the operating system 50) to the store programmer 48.

In operation, as will be described in greater detail below, a user manipulates the keyboard 44 and mouse 46 to edit the data in the table 38 until data defining a control program has been assembled, and the control program is then written to a disk via the drive 48. The disk is then inserted into the ATM of FIG. 1 to act as store 6 thereof.

Naturally, rather than being written directly to disk the data may be downloaded via a communications link to a random access memory provided in an ATM machine.

In order to facilitate understanding of the invention, the behaviour of the above described embodiment will now be described in greater detail and, subsequently, the method by which this behaviour is achieved will be disclosed.

FIG. 4 shows a part of the display produced on the VDU 42 within a work space area 421 thereof. The ellipse 100 illustrated in FIG. 4a indicates a process, comprising a program or flow control subprogram, represented graphically. The process is arranged to execute, in succession, several groups of processes, each group comprising one or more concurrently executed processes. First and second groups of processes are represented by first and second rectangles 110,120, linked by a link line 130, within the ellipse 100. Each of the rectangles 110, 120 illustrates a group of sub programs or subroutines for concurrent execution.

Figure 4A:
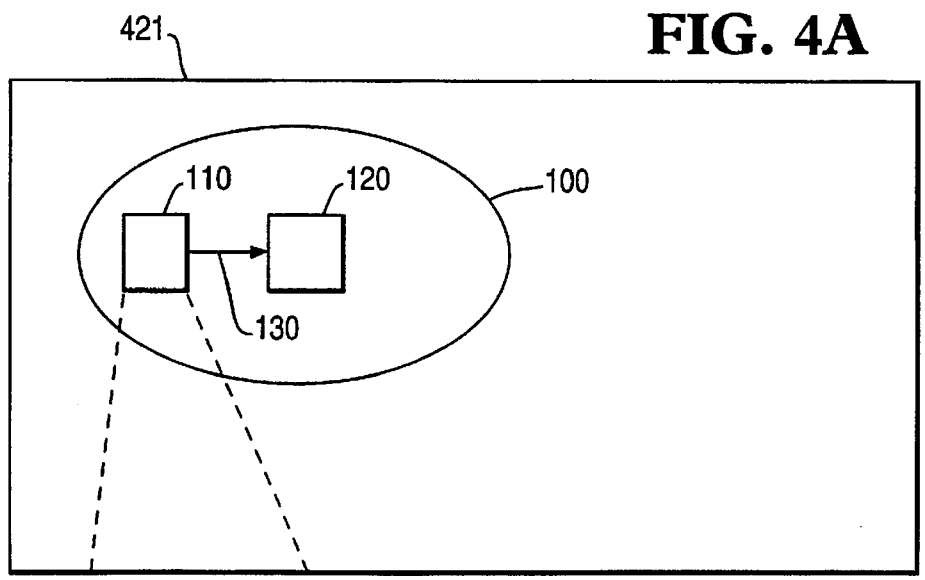
FIGS. 4a to 4d illustrate the appearance on the visual display unit of FIG. 2 of various components of a control program.
Figure 4B:
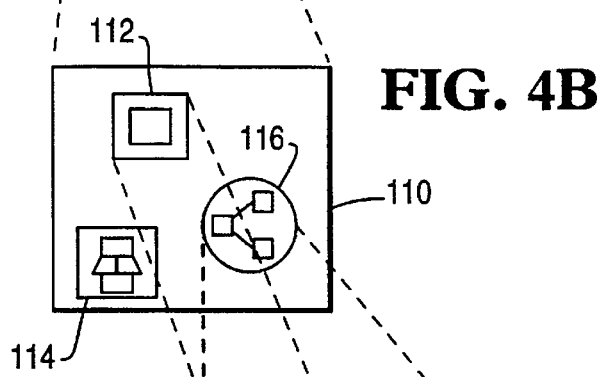
Figure 4C:
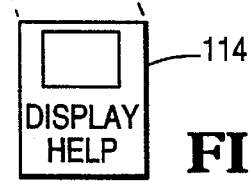

FIG. 4b illustrates an enlarged view of the rectangle 110, which contains first, second and third icons 112,114,116, each representative of a particular process (i.e. subroutine or function), the appearance of each icon 112–116 being indicative of the nature of the subroutine. For example, referring to FIG. 4c, the icon 114 indicates a routine causing a display screen to display an identification code.

The interpretation to be placed on FIG. 4a is that it specifies a control program in which, initially, the three processes corresponding to the three icons 112–116 in the first rectangle 110 operate concurrently, and then, on some condition, all three processes terminate and control flow passes to the processes specified within the next rectangle 120.

Figure 4D:
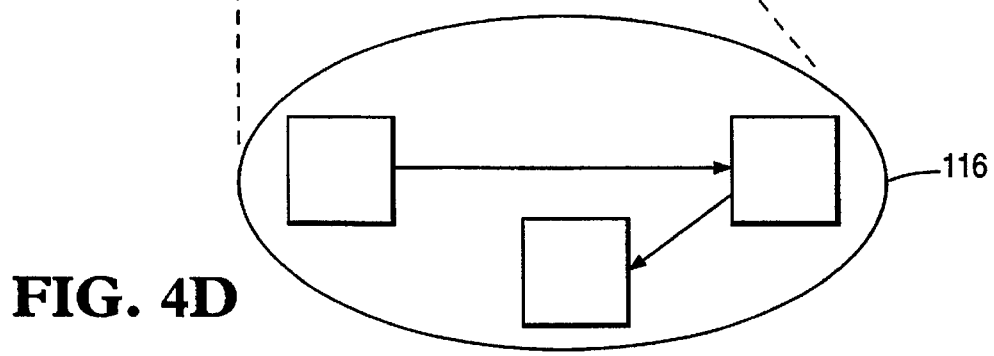

Referring to FIG. 4d, the icon 116 corresponds to a process which is itself a flow control function of the type shown in FIG. 4a, consisting of (three) groups of concurrent processes linked via lines showing control flow from one group to the next.

Figure 5:
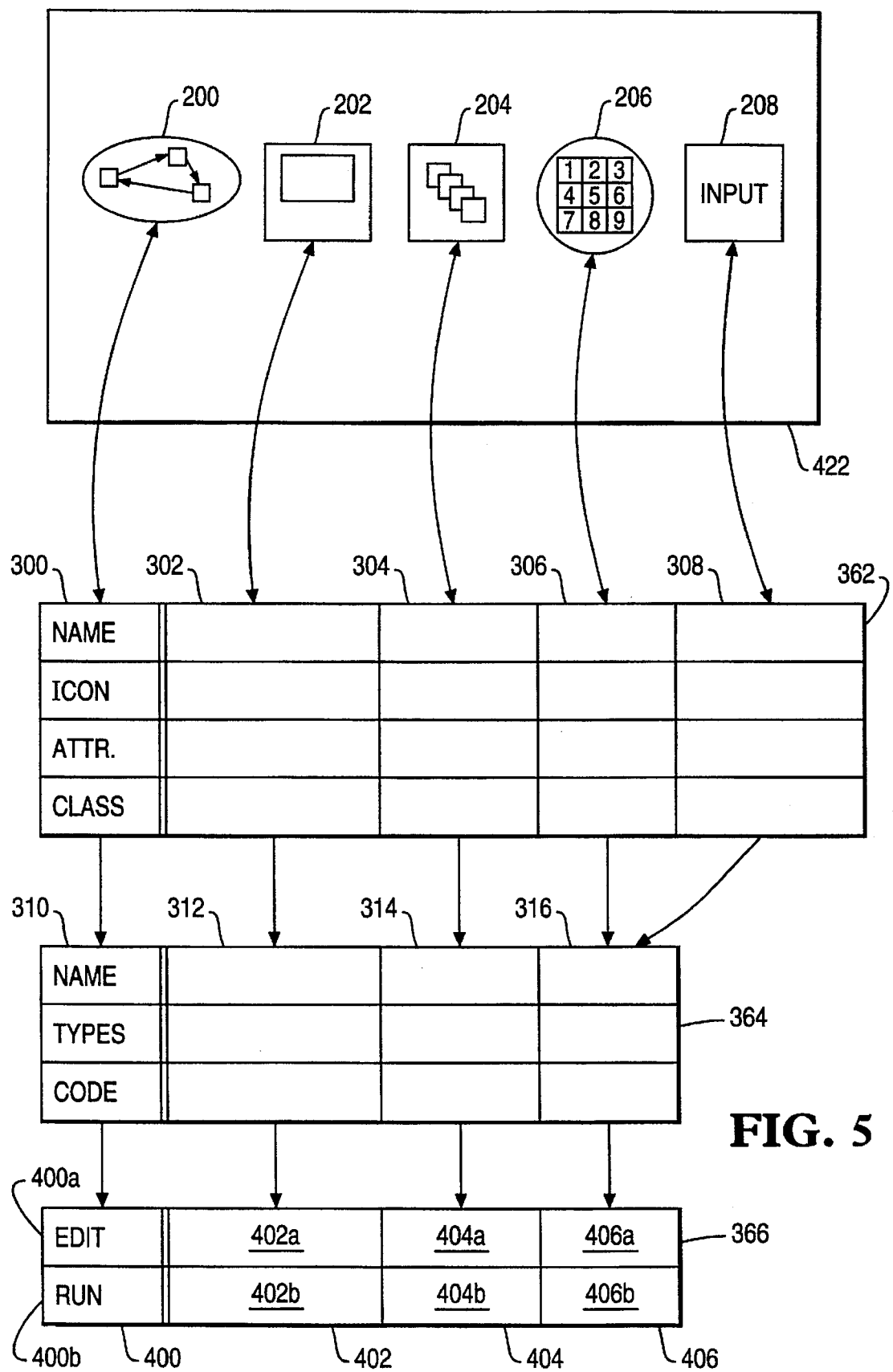
FIG. 5 illustrates the appearance of the visual display unit of FIG. 2 of a catalogue area, subimages and corresponding contents of a store forming part of FIG. 2.

FIG. 5 shows another part of the screen displayed on the VDU 42, comprising a catalogue area 422. Preferably, the catalogue area 422 of FIG. 5 and the work space area 421 of FIG. 4 are each displayed in windows, the size and shape of which may be controlled by the user via the operating system 50 in conventional fashion.

Displayed within the catalogue area 422 are a plurality of icons representing archetypal subroutines which may be employed within the work space area 421, and hence in the control program. The catalogue area 422 includes a displayed icon 200 in the shape of an ellipse, representing a program or flow control subroutine like that 100 shown in FIG. 4; an icon 202 representing a screen display; an icon 204 representing the cash dispense operation; and an icon 206 representing a keyboard read operation, as well as further icons 208 etc.

Each of the icons 200–208 corresponds to a stored process record 300–308 within a process table 362 stored on hard disk within the disk drive 36. Each of the entries 300–308 within the process table includes a reference (e.g. the name, or another type of pointer) to a class definition record 310–316 stored in a class record table 364. Each class record 310–316 likewise contains a pointer to an executable machine code file 400–406 stored in an executable code table 366. Each code file 400–406 comprises an editing routine 400a–406a and a process execution routine 400b–406b, for reasons that will be described hereafter.

In addition to a pointer to the code, each class record 310–316 comprises a class name, and a list of data fields together with definitions of the data in each field (specifying its type (i.e. text/image/integer/real), range, number of is data, and data field name).

Each process record 300–308 comprises, in addition to the process name, a datum for each of the data fields specified in the respective class record.

Thus, each process record 300–308 represents an instance of a class defined by the corresponding class record. As indicated, multiple process records (e.g. 306,308) may refer to the same class record (316).

Referring to FIG. 5, in the case of the process record 300, which corresponds to a flow control process, the data held on the process record 300 comprises a list of work groups, the list specifying the order of execution of the work groups.

The process records 306, 308 correspond to different input routines, and contain different data specifying input sources.

In this embodiment, each class record 310–316 may also be associated with a "dummy" instance; for example, the icon 208 indicates a generic input process corresponding to the class record 316.

It will therefore be apparent that, in this embodiment, the process represented by the icons 200–208 correspond to an Object-Oriented Representation, each process comprising an object defined by a data record comprising an instance of a class associated with executable code.

Loader 16

Figure 6:
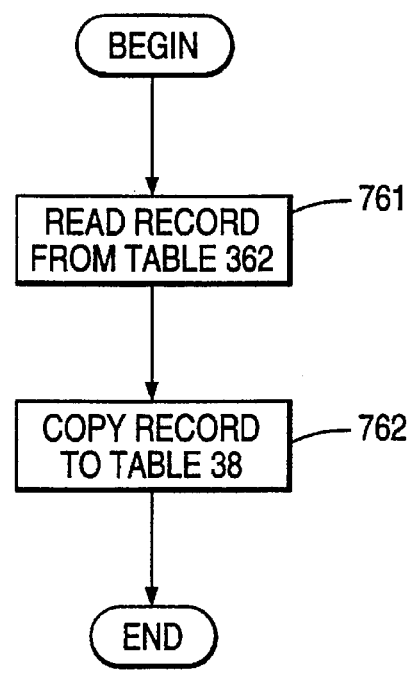
FIG. 6 is a flow diagram illustrating the structure of a loader routine forming part of FIG. 3.

Referring to FIG. 6, the operation of the loader routine 76 is indicated. The routine is initiated by the operating system 50 when a user selects one of the icons 200–208 from the catalogue area 422 with the mouse 46 (e.g. by double clicking). In a step 761, the process record 300–308 corresponding to the selected icon is read from the table 362 stored on the hard disk within the disk drive 36. In a step 762, the record is copied into the table 38 within the random access memory 38.

Displayer 74

Figure 7A:
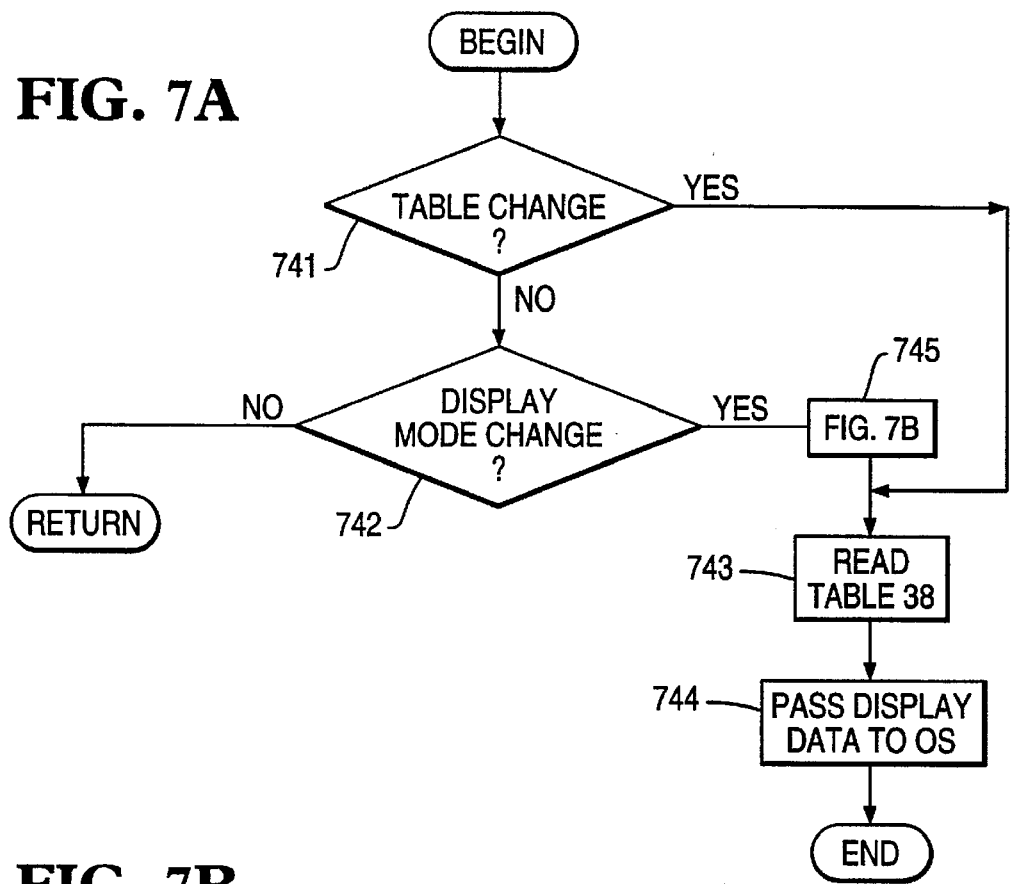
FIG. 7a is a flow diagram illustrating schematically the operation of a displaying routine forming part of FIG. 3.

Referring to FIG. 7a, the operation of the displayer routine 74 is indicated. On detecting an input event (manipulation of the mouse 46 or keyboard 44) the displayer routine 74 detects, in a first step 741, whether the contents of table 38 have been changed by the loader 76 or editor 72. In the event that the contents of the table 38 have not been changed, the displayer checks, in a step 742, whether an instruction to alter the display mode has been entered. If neither the table 38 has changed nor the display mode has changed, the displayer routine 74 terminates. If either has changed, the displayer routine 74 reads the table 38 in step 743, reads the corresponding icon for each element currently in the table 38, and generates a display in accordance with the current display parameters (object size, object position within the work space 421, and so on) and passes the display data to the operating system in step 744 to be written to the image buffer 40 and displayed on the VDU 42.

Thus, the contents of the workspace 41 constantly reflect the state of the table 38.

Changes to the display mode are of two types; firstly, changes which are common to graphical user interfaces in general, such as changes to the viewpoint within the workspace (enabling a user to navigate around the workspace area 421); and scale changes, enabling the user to change the reproduction scale of the workspace area 412, to zoom in and out of areas of the workspace area. These mode changes are dealt with in conventional fashion and will not be discussed further. Other conventional display mode changes such as opening or closing, or changing the size of, the workspace area 423; or simultaneously displaying other areas such as the catalogue area 422; are preferably also available in conventional fashion.

The second type of display mode change is to increase the amount of information available on selected parts of structured display in the workspace area 421. Where any icon is displayed within the workspace area 421, a corresponding active area of the workspace 421 is defined around the icon, such that when a user selects the icon by positioning the cursor within the active area shown on the screen 42 and pressing a button on the mouse 46 or a key on the keyboard 44, an expanded view is generated, as illustrated in FIG. 8b, showing in greater detail any subfunctions that the function is made up of as a series of icons. The expanded view is, as shown, linked to the icon to which it corresponds by a pair of lead lines, 424a,424b.

Figure 8A:
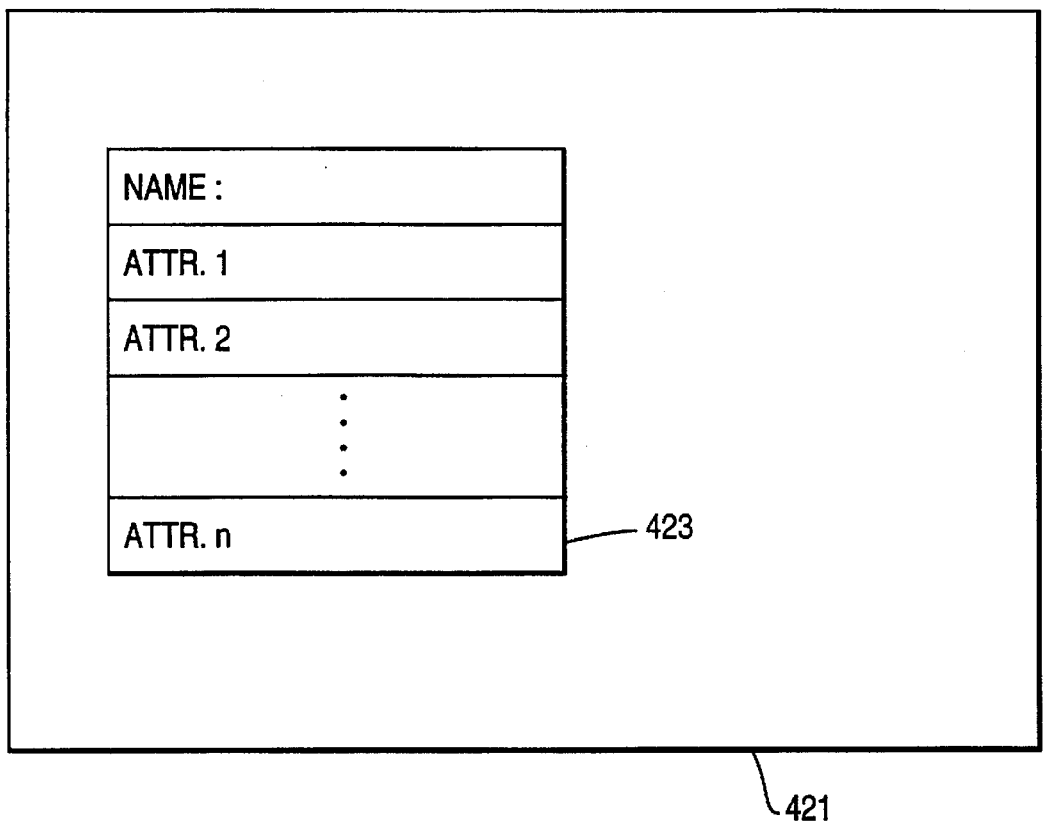
FIG. 8a is a diagram illustrating schematically the appearance of a text data display area on the visual display unit forming part of FIG. 2.
Figure 8B:
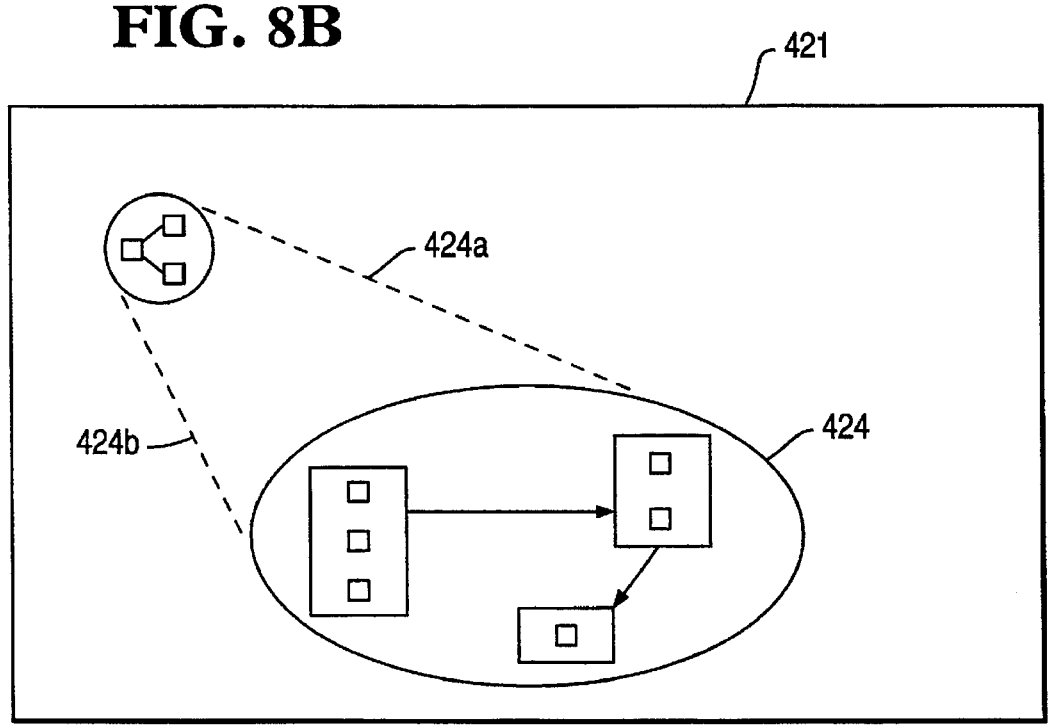
FIG. 8b is a diagram illustrating schematically the appearance of an expanded view on the visual display unit of FIG. 2.

The displayer routine 74 is operable also, on receipt of an input (e.g. by double clicking the mouse 46 on the corresponding icon within the work space area 421) to display in another area of the work space 421 a representation of the data held in the record within the table 38 for the corresponding icon and, preferably, a textual description of the function corresponding to the icon in a data display window 423, illustrated in FIG. 8a.

Figure 7B:
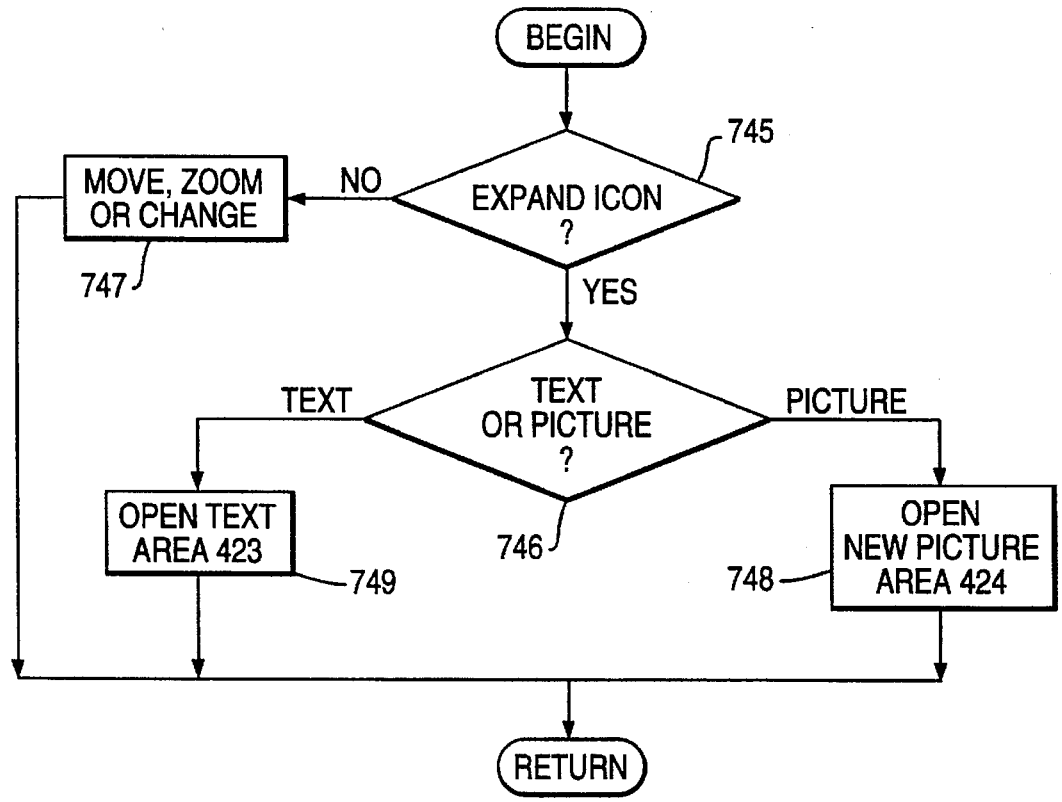

FIG. 7b illustrates the operation of the displayer routine 74 in changing mode. If expansion of an icon is detected in step 745, the displayer routine 74 detects whether a textual display of data or an expanded image is required in a text 746. If not, the navigation, expansion or background colour change operation required is performed in step 747.

If (in step 746) a textual data display is required, the displayer routine 74 opens a text data display area 423 within the workspace area 421 in step 749; if a pictorial expansion is required, the displayer routine 74 opens a picture display area 424 within the workspace area 421, connected to the icon concerned by a pair of lead lines 424a,424b and displaying any icons corresponding to functions making up the function associated with that icon in step 748.

Data Table 38

Prior to explaining the operation of the editor routine 72, the structure of the data held in the data table 38 will be discussed in greater detail.

Figure 9A:
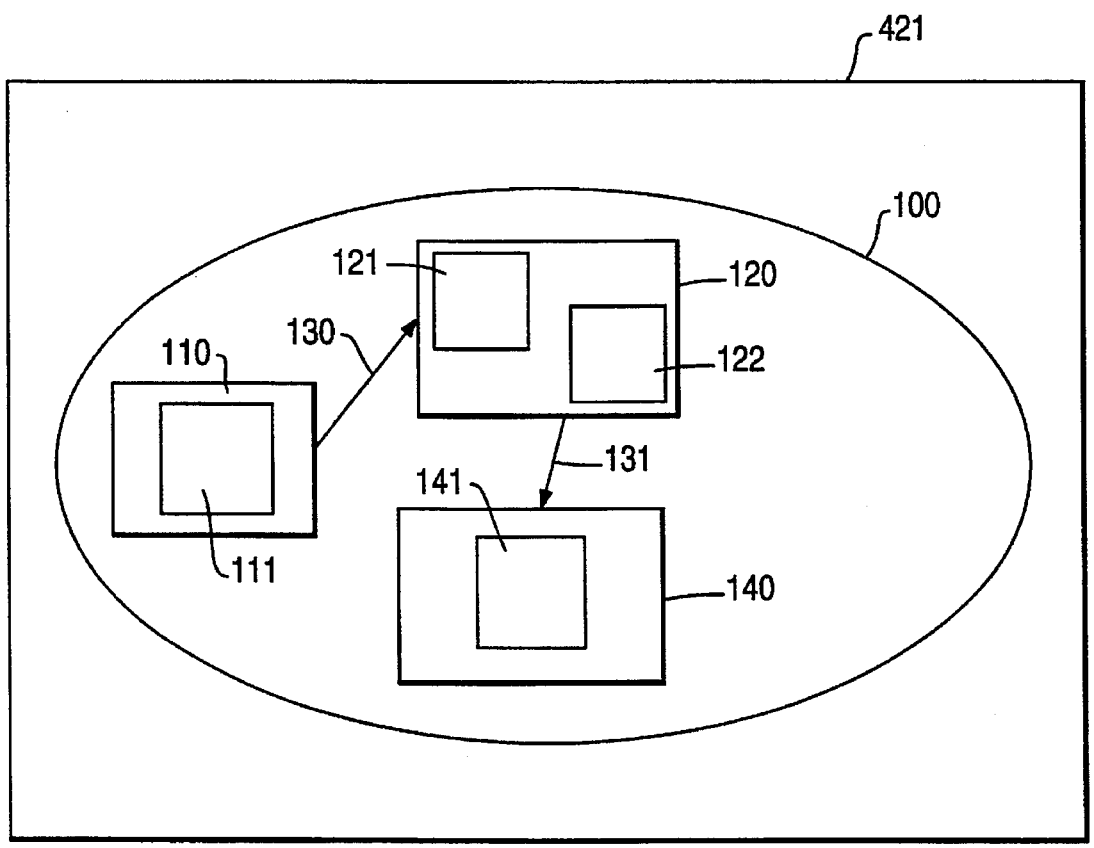
FIG. 9a is a diagram showing an example of a control program display on a visual display unit forming part of FIG. 2.

FIG. 9a shows an illustrative control program display in the workspace area 421 and comprises an ellipse 100 representing the program, and including subroutine groups 110,120,140 (hereinafter referred to as "work groups"), interconnected by link lines 130,131, (hereinafter referred to as "work flows"). The first work group 110 includes an icon 111 representative of a first process; the second work group 120 includes icons 121,122 representative of concurrently operating process within that work group; and the third work group 140 includes an icon 141 representative of a process.

Figure 9B:
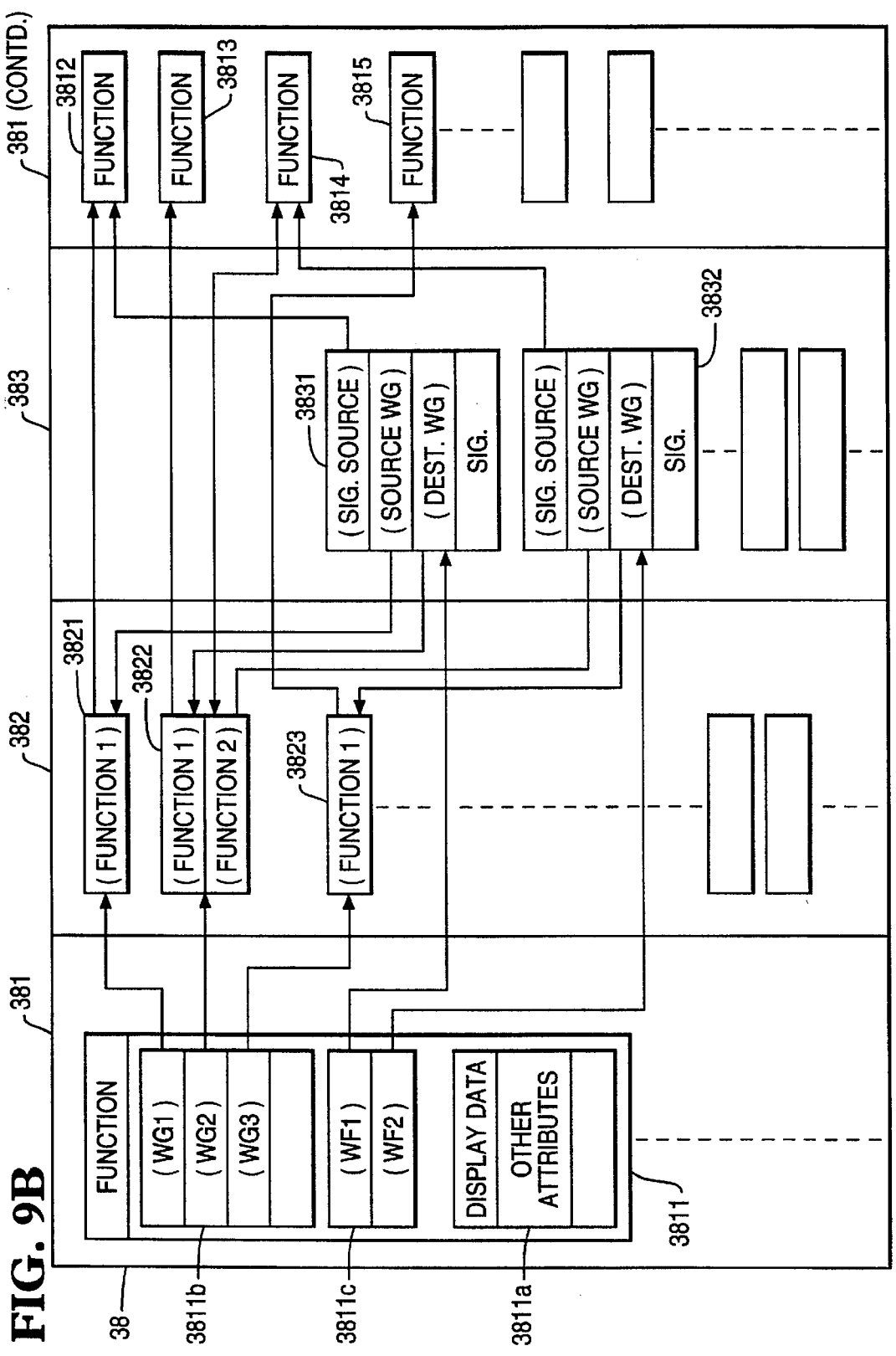
FIG. 9b illustrates the corresponding structure of a control program data table stored in memory forming part of FIG. 2 to represent the control program.

Referring to FIG. 9b, the table 38 comprises a first table 381 (hereinafter referred to as the process table) including respective entries 3811, 3812,3813,3814,3815 corresponding respectively to the program (which is itself treated as a process) 100 and processes 111,121,122 and 141; a second table 382 (hereinafter referred to as the work group table) containing respective entries 3821,3822,3823 corresponding respectively to the work groups 110,120,140; and a third table 383 (hereinafter referred to as the work flow table) including entries 3831,3832, corresponding to the work flows 130 and 131.

Referring to FIG. 9b, the entry in the process table 381 for each process comprises a first field 3811a, which defines the attribute data values for the process, such as, for example, signals generated and consumed by the process.

Also included is a pointer to the class record 310–316 on the hard disk drive 36.

If the process is a flow control process, made up of a sequence of other processes (as is the program 100), the entry 3811 in the process table further comprises a list 3811b of work group pointers pointing to respective entries in the work group table 382. Thus, in the case of the entry 3811 corresponding to the program 100, the work group list contains pointers to a first entry 3821 corresponding to the work group 110; a second entry 3822 corresponding to the work group 120; and a third entry 3823 corresponding to the work group 140. The pointers are in an order within the list; the first pointer indicating the first work group executed on calling the function.

Each work group record 3821–3823 in the work group table 382 consists of a field (not shown for clarity) defining attribute data of the work group, including the appearance of the work group (i.e. a rectangle). Each record also comprises a list of pointers to the process or processes in the process table 381 which are comprised within the work group.

Thus, the work group entry 3821 includes a pointer to the process record 3812 since the corresponding work group 110 includes the corresponding process 111; the work group record 3822 corresponding to the work group 120 includes pointers to the process entries 3813 and 3814 corresponding to the processes 121 and 122; and the work group entry 3823 corresponding to the work group 140 includes a pointer to the process entry 3815 corresponding to the process 141.

Also comprised within the process entry 3811 for a flow control process (which includes a sequence of work groups; i.e. the program 100) is a list 3811c of work flow pointer entries, pointing to entries 3831,3832 . . . in the work flow table 383 corresponding to work flows 130, 131 making up the process.

As shown, each entry in the work flow table 383 comprises a pointer pointing to the work group which comprises the source of the work flow; a pointer to the work group comprising the destination thereof; and a pointer to the process within the source work group which gives rise to a signal to cause a transition to the next work group, together with a field recording the identity of the signal.

Thus, the work flow record 3831 points to the work group record 3821 corresponding to work group 110 as the source work group and the process record 3812 corresponding to the process 111 as the source process; and the work group record 3822 corresponding to the work group 120 as the destination work group.

Editor 72

In this embodiment, the editor routine 72 performs the following operations:

Process input—a new entry in the process table 381 is opened by the editor routine 72, and the user is prompted to enter attribute data in the field 3811a, and, if required, work group pointer data in the table 3811b and work flow pointer data in the list 3811c.

Process copying—one entry in the process table 381 is copied into a new entry, which is then available for modification.

Replicate referred process—where, as just described, an entry into the process table 381 or work group table 382 has been copied, the contents of the pointers will normally remain unchanged so that the new process or work group will point to the same processes as that from which it was copied.

Optionally, where the structure of the new process is to be amended, the editor 72 further makes copies of any work groups pointed to by the process, any processes pointed to by the or each work group, and so on; and amends the pointers within each process and work group to point to the copies; so as to permit the copied process or work group and all components of it to be edited separately of the process or work group from which it was copied.

Process modification—the attribute data stored in the field 3811a is displayed in the textual data display area 423 and may be edited by the user by positioning the cursor at the desired area of the display using the mouse 46 or cursor control keys on keyboard 44 and overtyping using the keyboard 44. The characters typed into the keyboard 44 are written by the editor routine 72 into the corresponding positions in the attribute data field 3811a.

Moving—a process or work group may be moved within the workspace area 421 by the user. For example, a process may be removed from one work group and positioned in another by selecting the corresponding icon with the mouse, and performing a "drag and drop" movement to the new work group.

In response to the selection and dragging (i.e. motion of the mouse 46 with a control button thereof pressed) the editor 72 is operable to detect the position of the cursor, to move the icon within the workspace area 421 to follow the cursor; and, when the control button on the mouse 46 is released, to detect within which work group the icon is now located.

The work group records within the work group table 382 are then amended, to delete the pointer from the previous work group record to the process, and to insert a pointer within the new work group record to the entry in the process table 381 corresponding to the process represented by the moved icon.

Similarly, a work group may be moved from within one displayed process to another by a "drag and drop" cursor operation, following which the editor routine 72 is arranged to amend the entries for the old and new processes within the process table 381, to delete the previous pointer to the work group and insert a new pointer.

Work group creation—the editor 72 is arranged, on receipt of a corresponding instruction signal from the keyboard 44 or mouse 46, to create a new entry in the work group table 382, and to amend the entry in the process table 381 for the process within which the new group is located in the workspace area 421 to point to the new work group entry.

Work flow creation—the editor routine 72 is arranged to allow the definition of a new work flow by selection, by the user, of one work group which corresponds to the source work group, followed by movement of the cursor using the mouse 46 to another work group which corresponds to the destination work group. On detecting that the cursor has reached a destination work group, the editor 72 draws a line linking the destination work group with the source work group, with an arrowhead pointing towards the destination work group, to indicate the work flow.

At this point, the editor routine 72 creates a new entry in the work flow table 383, with pointers to the records in the work group table 382 corresponding to the source and destination work groups.

By selecting the work flow (e.g. by positioning the cursor on the line), the user can then input, via the mouse 46, the process within the source work group which causes the transition to the next work group.

At this point, the editor routine 72 amends the entry within the work flow table 383 to add the pointer to the selected process as the source process. Where the source process generates only one signal, the identity of the signal is entered by the editor routine in the record at that time; otherwise, the user is prompted to select a signal from the textual data display area 424 using the keyboard 44 and the identity of the selected signal is entered in the signal field of the work flow record.

Amending work flows—by selecting either the source or destination ends of the arrow representing the work flow in the workspace area 421 using the cursor, the user may change either the source or destination of the work flow. Upon selecting a new work group corresponding to the source or destination work group required, the editor 72 detects the position of the cursor, and amends the work flow record to delete the reference to the previous source or destination work group and replace it with a reference to the newly selected work group. By re-selecting the work flow, the user may alter the source process or signal actuating the work flow, in the same manner as described above.

Share—a process may be called from two or more work groups. If the process is to be identical in each case, then rather than create a new copy of the process for each work group, the entry within each subsequent work group record in the work group table 382 is modified to point to the same process by the editor routine 72.

Unlink—a process may be removed from a work group by selecting the process within the work group utilising the mouse 46 and operating, for example, a delete key on the keyboard 44. The editor 72 is responsive to delete the pointer to the process within the work group table 382, and thereafter the displayer 74 ceases to display the icon for the process within the corresponding work group. Likewise, a work flow or work group may correspondingly be deleted by operation of the mouse 46 and keyboard 44, causing the deletion of pointers within the process table 381 to the corresponding entry in the work group table 382 or work flow table 383.

The displayer 74 displays the contents of the workspace area 421 by locating the first process records 3811 within the process table 381; referring to the display data held within the attribute data record 3811a therein to draw the process as an ellipse; then referring to each of the work group pointers to access the corresponding work group records 3821–3823 within the work group table 382, to draw the corresponding work groups in accordance with their stored display data (in this embodiment representing each by a rectangle). The displayer 74 then accesses the process pointers within each work group record thus accessed to locate the corresponding records within the process table 381 for each process within each work group.

The icon data stored within each process record is then accessed to display the corresponding icon within the work group.

Finally, referring back to the first process record 3811, the displayer routine 74 accesses in turn each work flow record pointed to from the work flow pointer list 3811c within the work flow table 383, and generates a corresponding arrow representation from the source work group to the destination work group corresponding to the work group records pointed to from the work flow record.

Conveniently, all of the above options are presented for selection by the user, for example in the form of a drop-down menu bar at the top of the workspace area 421.

Thus, it will be seen that the joint operation of the editor routine 72 and displayer routine 74 enable the user to construct, graphically, the contents of the table 38, either with processes amended or created directly, or with processes copied initially from those already stored on the hard disk drive 36 via the loader routine.

Checking

The contents of the table 38 can then be compiled by the compiler 78 as will be described in greater detail below. However, it is convenient to provide that the editor 72 has a checking stage, prior to operation of the compiler 78, to perform some checks to ensure that the contents of the table 38 correspond to a sensible control program.

A first relatively straightforward check ensures that each record in the work flow store 383 includes a pointer to a source process and an indication of the signal actuating the work flow. A second check reviews all records in the process table 381; locates any record for which the attribute data field 3811a includes an indication that the process cannot be shared (that is, operated concurrently multiple times, as for example is the case with device driver processes such as card reader handling processes) and then reviews the pointer fields of the entries in the work flow and work group tables 382,383 to ensure that the corresponding entry in the process table is not pointed to from more than one work group which may be operating simultaneously.

Further checks which may be performed include a recursion prevention check, which operates to review all entries in to the process table 381 to ensure that no entry includes a pointer to a work group which in turn points to the process itself, or to another process which includes another pointer to a work group which points to the original process itself.

Checks are also preferably performed on each entry in the work flow table 383, to ensure that the signals generated by all processes are handled consistently. Firstly, ambiguity is avoided by determining any entries in the work flow table which have the same source work group, source process and source signal pointers; if the destination work groups are in each case the same, then one of the entries is deleted as being redundant, whereas if the destination work groups were different, the editor 72 prompts the user to select one or other of the flows prior to compilation (since otherwise generation of the same signal would lead to ambiguity as to which of the succeeding work groups should be selected).

Finally, a check is made of each signal which may be generated by a process and which is not referred to in an entry in the work flow table 383. The work group records in the work group table 382 preferably, in this embodiment, include an optional field which may be set to indicate that any such unused signal is to be erased in the control program on leaving the work group. If such a field is not set, the corresponding signal will be available for use by other processes which call the process within which the work group is located.

A check is therefore made by the editor 72 to confirm whether or not, in such a case, any signal is not used by all processes. If signals are possible which are not used by any process within the memory 38, the editor 72 prompts the user to re-edit the contents of the table 38 prior to compilation by the compiler 78, since the control program would otherwise be in an indeterminate state if such a signal were generated during operation.

Compiler 78

The general operation of the compiler 78 is to create a control program which consists of a number of subroutines, each corresponding to an entry in the process table 381 and each consisting of the executable code 400b–406b from the code table 366 which corresponds to the class of which the process table record 3811 is an instance. Together with the code is provided, for each subroutine, data corresponding to the attribute values held on the process table 381 for the process record.

Each of the subroutines corresponding to a process record 3811 is an autonomously operating "virtual machine", which responds to input events on the ATM CPU 2 (from the bus 4 or the bus 10) and message signals generated by other subroutines, and itself generates message signals. Each subroutine includes an interface (comprising the subroutine name and a set of parameter types) which defines the signals and events accepted by the subroutine; different subroutines are conveniently arranged to share the same interface but differ in the manner in which the signals or events are processed.

Figure 10:
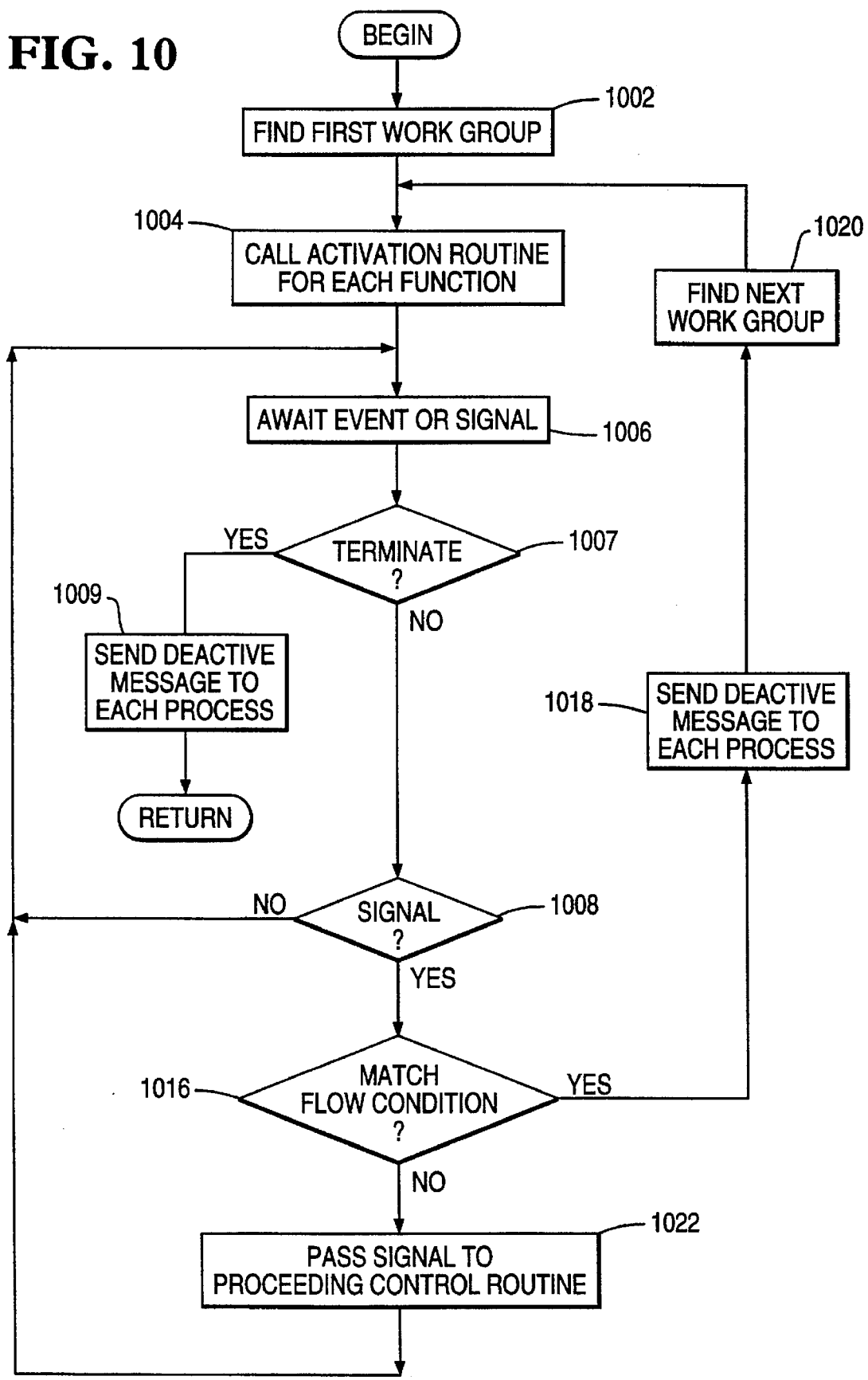
FIG. 10 is a flow diagram showing schematically the structure of executable code generated by a compiler program forming part of FIG. 3 in response to a flow control program function.

The code for performing a flow control process is illustrated in FIG. 10. The overall structure of the control program itself is dictated by the flow control process 100 representing the program.

On a call to the flow control process, first, in step 1002, the first work group comprised within the process is located.

In a step 1004, an activation routine for each in turn of the processes comprised within the first work group is performed, so as to cause those processes to commence asynchronous simultaneous operation.

In a step 1006, the program enters an event loop, in which (whilst the processes within the first work group are concurrently executed) the work flow control process awaits an external event (such as a hardware generated event caused by a key press or a signal from the card mechanism 12 or timer 24).

All processes in the currently active workgroup likewise receive all such events.

If, at the step 1006, a signal is received instructing the termination of the process, this is detected in a step 1007, and in a step 1009 a signal is sent to each function activated in the step 1004 to instruct that function to terminate. The function then itself ceases operation and control passes back to the process from which it was called.

If no event is detected in the step 1006, the concurrently executing functions are polled for output signals in a step 1008. If no such signals are available, the event loop recycles.

If a signal is detected, in a step 1016 it is tested whether the signal is a signal from a source process which corresponds to the data held in a work flow table entry for which the current work group is the source work group. If it is, then in a step 1018, each of the processes which was activated in the step 1004 is deactivated by a message sent to each active process. Then, in a step 1020, the next work group (i.e. the work group which was the destination work group for the work flow concerned) is selected and control passes to the step 1004.

In the event that the signal does not match any signal required for a work flow, in the step 1022 the signal is transmitted as a message to the process from which the process of FIG. 10 was called (if any); if the process of FIG. 10 is the main body of the program, then the program returns control to the operating system.

It will be apparent from the foregoing that the action of the compiler 78 is therefore to create a hierarchical program, consisting of a first program structure corresponding to the structure of the program flow control process 100, and having one or more sequential stages of execution, in each of which stages (corresponding to the work groups within the table 38) more than one process may simultaneously be executing.

Each of these processes may, in turn, define a control flow structure consisting of a number of functions, and so on. Events generated by the hardware elements of the ATM or other target machine are passed by the highest program structure in the hierarchy (that corresponding to the program flow control process 100) down through each successive stage in the hierarchy. Signals generated by functions in the hierarchy are passed up the hierarchy, and are either utilised for flow control, or by other processes in the layer above, or are passed through successively higher layers until they are utilised.

Figure 11:
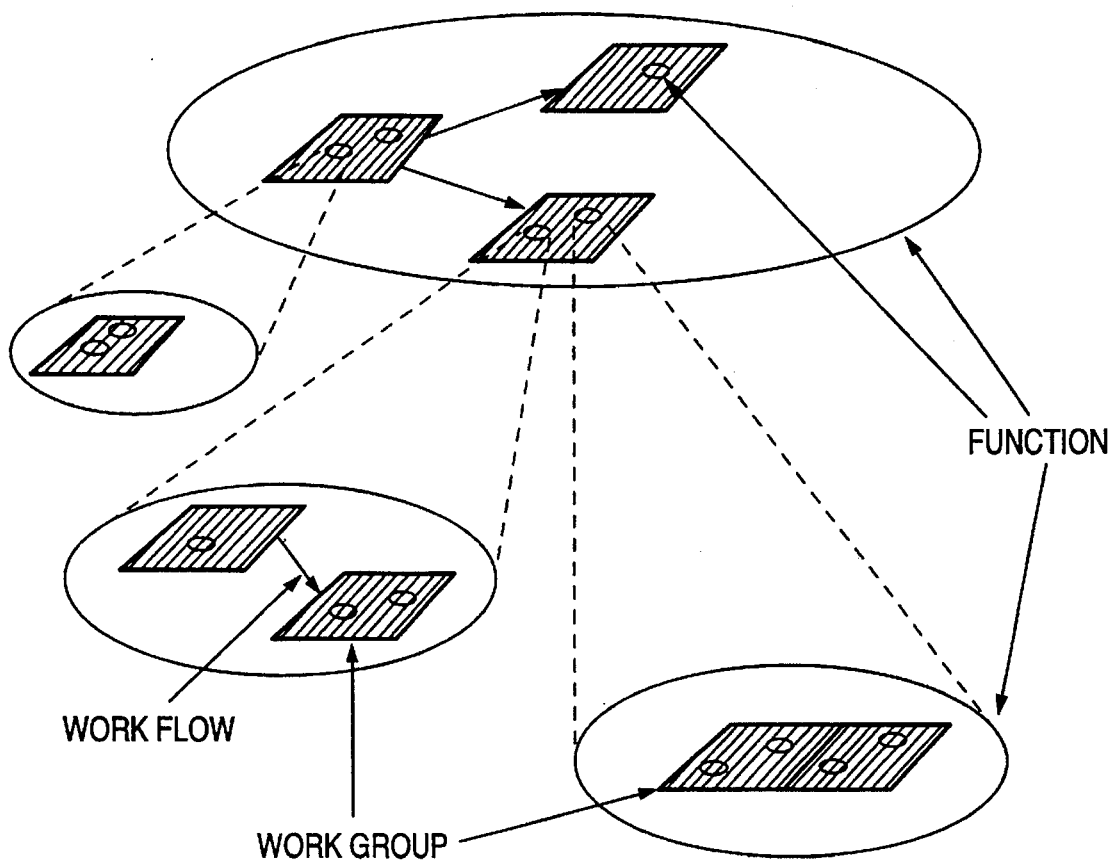
FIG. 11 is a schematic diagram illustrating the hierarchical arrangement of flow control program functions generated by the compiler.

This hierarchical structure is illustrated schematically in FIG. 11.

Figure 12A:
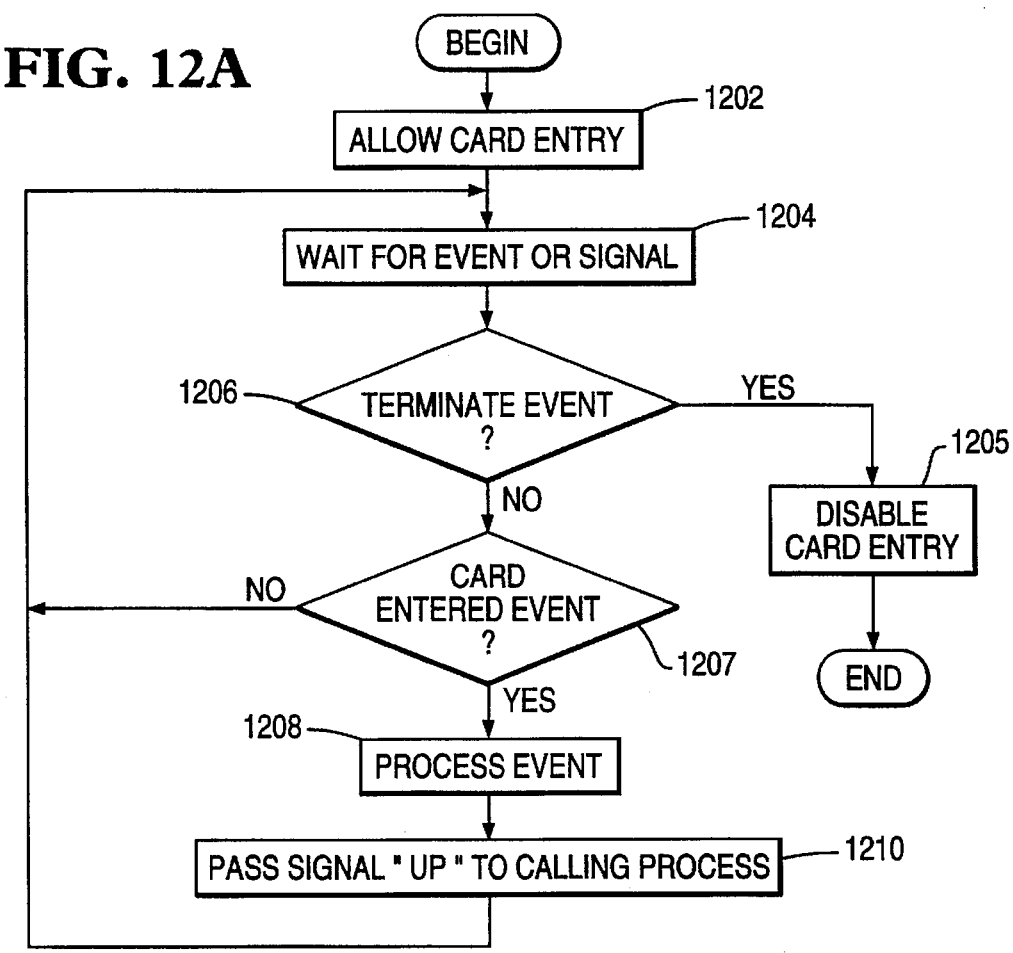
FIGS. 12A and 12B are a flow diagram illustrating the code generated by the compiler in response to a non flow control program function.

Referring to FIG. 12a, a first exemplary structure of the code generated by the compiler 78 for a process which is not a flow control process is illustrated. In fact, this structure corresponds to a card reader which makes use of external events.

On being activated in the step 1004 of FIG. 10, the process of FIG. 12 performs initiation tasks in a step 1202 (for example, reading the initial state of a card transport mechanism and allowing card entry). In step 1204, the process then enters an event loop, until a signal indicating an event is passed to the routine in the step 1010 of FIG. 10.

If the signal comprises a termination signal, in a test 1206, the process of FIG. 12 disables card entry and terminates execution. If not, the process tests for a card reader entry event in a step 1207 and, on detection of card entry, reads and processes the data in a step 1208 and, if the event gives rise to the generation of one or more signals, these are generated in a step 1210. Control then passes back to the event loop 1204 to await the next event.

Figure 12B:
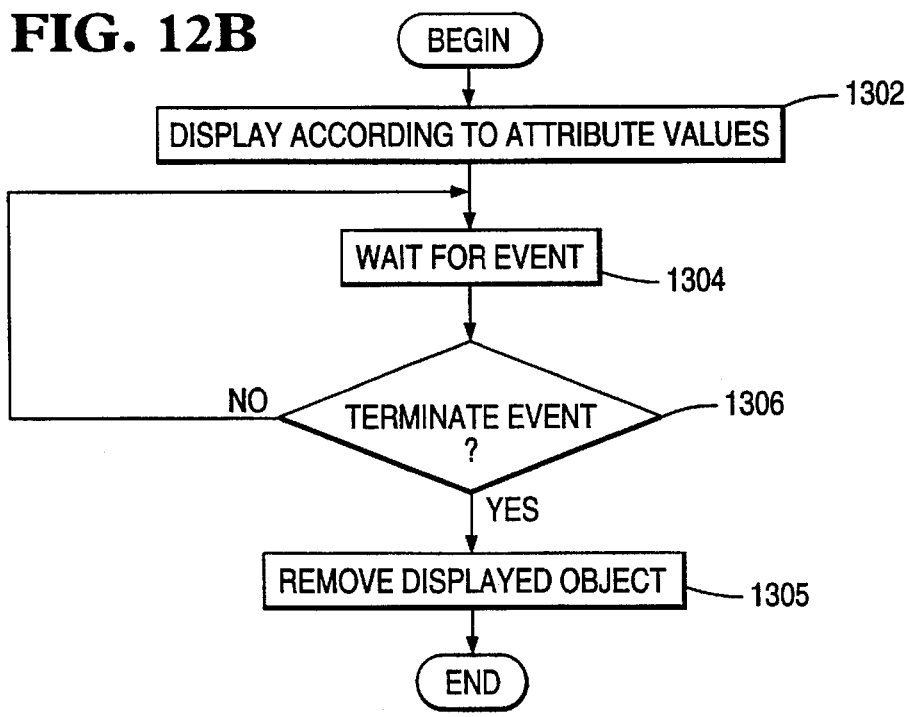

Referring to FIG. 12b, in the case of a display function, on receiving an activation message, in a step 1302 the display function creates an output display according to the display attribute data defining the image to be displayed. In a step 1304, the function then enters an event loop. When an event is detected, the function tests, in a step 1306, whether the event comprises a terminate signal and, if not, resumes awaiting an event. In the event that a terminate signal is received, in a step 1305 the display is removed and the function terminates.

The code executed by other functions depends, of course, upon the purpose of the function concerned.

Figure 13:
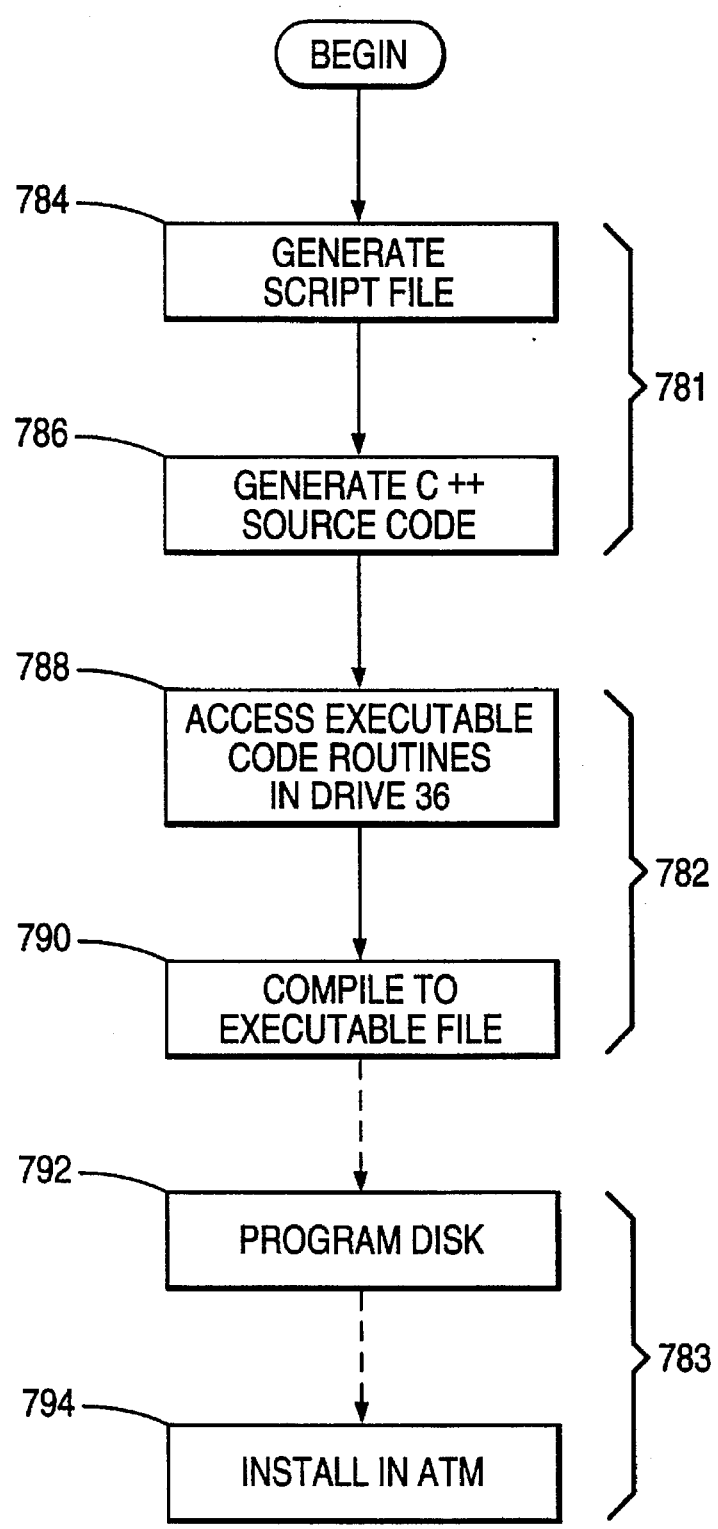
FIG. 13 is a flow diagram illustrating the operation of the compiler, and subsequent stages in manufacturing a control program.

Referring to FIG. 13, more detail of the operation of the compiler 78 will now be described.

Conveniently, the compiler 78 comprises a first process 781, in which a control program specification is generated which is independent of the target CPU 2, and a second process 782 in which the target independent program specification is converted into a target dependent executable code file suitable for supply to the PROM programmer 48. For completeness, FIG. 13 illustrates also the remaining steps in the manufacture of the ATM equipment as a third process 783.

In this embodiment, the target independent control program specification is generated by, firstly, generating in a step 784 a script file of text which replicates the contents of the table 38. The script file consists of a number of script records separated by a buffer character, each record consisting of a record name, followed by a list of arguments. In this embodiment, the syntax of the script file is subset of the syntax of the C language.

In this embodiment, in the table 38, every data field is typed; that is to say the type of the data is identified (e.g. floating point, Boolean, alphanumeric and so on). This typing of the data, together with the association of records in table 38 with classes identifying the properties of the record, enables a C pre-processor forming part of the compiler 78 to generate, in a step 786, a source code file in the C++ computer language from the script file by creating, for each record in the script file, a correspondingly named instance of the class information stored on the hard disk drive 36 with the attribute data in the script file.

Next, in a step 788, a C++ compiler for the target processor 2 forming part of the compiler 78 accesses the editing routines 400a–408a stored on the hard disk 36, which create data structures for interpretation by the respective executable code 400b–406b in a format useable by the target CPU 2. Next, the compiler 78 accesses the executable code routines 400b–408b (in the machine language associated with the target ATM CPU 2) stored on the hard disk drive 36, and, from these, supplies an executable machine code file in a step 790, which is stored on the disk drive 36. At some subsequent time, the executable code file is supplied to the store programmer 48 which programs a disk in a step 792, and in a step 794, the disk is removed from the disk programmer 48 and installed as the store 6 of the ATM system of FIG. 1.

The CPU 2 is arranged to provide for simultaneous execution of functions by the use of conventional multitasking techniques which divide the time available on the CPU 2 between the different concurrent programs. Where the CPU 2 comprises multiple processor devices, the compiler 78 may instead provide for execution of a different function in each device.

Although the present invention is applicable to many different applications, the functions which are provided on the hard disk 36 and represented in the catalogue area for an ATM application will now briefly be described.

Basic classes are:

Flow control function—This function has been described above in detail.
Timer—This function reads the timer device 24, and generates an output signal a predetermined time after function has commenced execution; the predetermined time is set within the attribute data for the function.
Selector—This function passes control to one of a plurality of component functions in dependence upon the value of an input variable, in the same manner as a "on . . . goto", or "case" statement in a high level programming language.
Presenter—This class generates a display on a screen of image data, or (if the attribute data is sound data) generates an audible presentation of the data.
Data Manipulation—A number of classes of data manipulation function are provided. A first is a data store function which accepts data and allows data to be read, to provide for a synchronous transfer of data between different functions. More complex functions include copy, compare, computation, and record handling functions, and so on. These classes are designed to manipulate, in general, data from: the user, communications channels, card tracks, databases and other external sources.
Data Entry—This set of classes provides functions for collecting data from user and operator keyboards, and/or touch screens. For example,in an ATM application with a 12 key keypad, each key may be provided with a data entry function for reading the key and supplying the string associated with the key.
Resource Management—This function may be provided for ATM applications where several different control programs are operating concurrently, to share access to the ATM CPU 2 or other resources.
Device control—These classes provide the control programs for operating the following:
magnetic card readers/writers
receipt printers
journal printers
in service indicators
facia light
remote status indicators
cash handlers
envelope dispensers
depository/document acceptors
alarms
Communications—These classes provide functions for sending and receiving messages via modem and a communication channel.
Security—These classes provide functions for supporting security standards (e.g. PIN encryption/verification, message authentication etc.).

Also provided on the hard disk drive 36 are one or more example control programs ready assembled from the above components.

Other functions which may be available may control access to night safes, cameras, security doors, smart card readers and so on.

Simulator 80

To provide an indication of the function of the control program prior to supply of the executable code to the store programmer 48, a simulator routine 80 may optionally be provided, in which the control program is executed by the CPU 30. If the CPU 30 is of the same type as the CPU 2 or, at any rate, is able to execute the same code (i.e. because the two are members of a compatible family of processors) then the processor 30 may simply read the disk drive 36 and execute the control program.

To achieve this, the simulator routine 80 intercepts calls to and from the ATM peripherals and re-routes them to simulation routines forming part of the simulator 80; thus, for example, under operation of the simulator 80, a signal which is generated by the CPU 30 and would have been supplied to the ATM device bus 10 to cause dispensing of banknotes is caused to generate an interrupt signal which, instead, executes a banknote dispenser simulation routine in which the VDU 42 displays the dispensing of the banknote which would have taken place in an ATM machine.

Likewise, input of a card, or numeric data, is simulated by manipulation of the keyboard 44.

In this manner, keys of the keyboard 44 or the mouse 46 emulate all ATM input devices (12, 18 . . . ) and areas of the VDU 42 emulate all ATM output devices (e.g. 14,16,20). The user may therefore test the operation of the program prior to programming the disk.

In the event that the CPU 30 is not compatible with the CPU 2, the simulator 80 comprises a C++ compiler for the host CPU 30 and the simulator 80 repeats the compilation steps 790 of the compiler process shown in FIG. 13 with this compiler to produce executable code for the host processor 30.

Alternatively, the simulator 80 may comprise a C++ interpreter, responsive to the contents of the table 38 to generate executable instructions for the host CPU 30 in real time. In this case, the interpreter may be arranged to operate simultaneously with the editor 72, so that when the contents of the table 38 are altered by the editor 72, the program executed by the simulator 80 is changed, thus enabling the user to assess the effect of changing program parameters in operation.

The system could in this embodiment, actually include an ATM device bus 10 and peripheral devices, to allow testing with these peripheral devices.

Other Alternatives and Modifications

It will be clear from the foregoing that the above described embodiments are by way of example only.

For example, whilst application to an ATM system is disclosed, it will be apparent that the invention is equally applicable to other stand alone control programs such as those required for the operation of bar code readers (for example). More generally, other stand alone applications such as industrial process control are suitable for the application of the present invention, but the invention may also be applied outside this sphere to any other type of control program for any type of programmable processing apparatus.

The particular graphical representations described above are advantageous but not limiting of the scope of the invention; in particular, a simultaneous operation of functions may be indicated otherwise than by grouping the functions within a bounding curve such as a rectangle, for example, by colouring all simultaneously operating functions in the same manner.

It will be equally understood that the particular operating systems and environments described above are convenient but not limiting; it would be possible to operate the present invention in any graphical environment.

Whilst an Object-Oriented data storage scheme is preferred, in other embodiments code and data may be stored together, and class definitions may be omitted.

Whilst one exemplary compilation process has been described, this aspect of the invention depends upon the target processor 2 concerned, and the present invention is therefore understood not to be limited to a method of compilation as described above.

Many other modifications to the above described embodiments will suggest themselves to the skilled reader. For this reason, the present invention is not to be limited to the above described embodiments, but extends to any and all novel subject matter disclosed herein, whether or not the subject of the accompanying claims.

What is claimed is:

1. A system for generating a control program for use in a target apparatus, said system comprising:

a processing unit for providing a visual interface representing (i) subimages which represent control processes which are grouped to represent a plurality of processes to be concurrently executed and (ii) links between said subimages to represent control flow from one group of concurrent processes to a successively performed group of concurrent processes; and an input device for enabling a system user to edit said subimages to generate the control program for use in the target apparatus.

2. A system according to claim 1, wherein said processing unit includes (i) a processor, (ii) a control program data store, and (iii) an editor program for controlling said processor to accept input from said input device to modify the contents of said control program data store.

3. A system according to claim 2, wherein said processing unit further includes (i) a visual display device and (ii) a display program for controlling said processor to display a graphical representation of the contents of said control program data store on said visual display device.

4. A system according to claim 3, wherein said processing unit further includes a compiler program for generating the control program from the contents of said control program data store.

5. A system according to claim 1, wherein the target apparatus is an automatic teller machine (ATM).

6. A system for generating a control program for a target apparatus, said system comprising:

a processor;

a visual display unit;

an input device;

a control program data store; and a program store including:
(i) an editor program for controlling said processor to accept input from said input device to modify the contents of said control program data store;
(ii) a display program for controlling said processor to display a graphical representation of the contents of said control program data store on said visual display unit; and
(iii) a compiler program for generating the control program from the contents of said control program data store;

said editor program being arranged to store control program data defining groups of sub programs for simultaneous execution on the target apparatus and control flow data defining a sequence of execution of said groups, said editor program permitting a plurality of sub programs in a group;

said display program being arranged to generate a display graphically representing said sub programs so as to indicate said groups, and control flows corresponding to said control flow data between said groups.

7. A system according to claim 6, further comprising a store which stores catalogue sub program data defining a plurality of catalogue sub programs, and wherein said program store also contains a loading program for loading selected catalogue sub program data into said control program data store.

8. A system according to claim 7, wherein said display program is arranged to generate a catalogue display on said visual display unit displaying an indication of said catalogue sub programs.

9. A system according to claim 8, wherein said indication comprises a subimage associated with each sub program.

10. A system according to claim 7, wherein said catalogue sub programs comprise a sub program record containing attribute data, and reference data associated with a class record relating to a class of sub program, said class record comprising code for performing the sub program in accordance with the attribute data.

11. A system according to claim 6, wherein said control program data store stores, for each sub program, a sub program record comprising attribute data defining the operation of the sub program, and reference data associating the sub program record with sub program code for executing the sub program in accordance with the attribute data, and said editor program is arranged to controllably edit the attribute data.

12. A system according to claim 11, further comprising a store storing the sub program code.

13. A system according to claim 6, wherein said program store further includes a simulator program arranged, in response to the contents of said control program data store, to cause said processor to simulate the action of the target apparatus under control of the control program.

14. A system according to claim 6, wherein said simulator program is arranged to execute the control program compiled by said compiler program.

15. A system according to claim 14, wherein said simulator program is arranged to control said operation of the processor whilst permitting the contents of said control program data store to be amended, and is arranged to be responsive to such amendments.

16. A system according to claim 13, wherein said simulator program is arranged to cause said processor to accept inputs from said input device when the control program requires inputs to the target apparatus.

17. A system according to claim 13, wherein said simulator program is arranged to cause said processor to generate outputs on said visual display unit when the control program requires outputs of the target apparatus.

18. A system according to claim 6, wherein said compiler program is arranged to perform a first stage of producing a target-independent control program, and a second stage of producing, from said target-independent control program, a target-dependent control program specific to the target apparatus.

19. A system according to claim 18, wherein said first stage of generating a target-independent control program comprises a step of generating a script file reproducing data from said control program data store.

20. A system according to claim 19, wherein said second stage of producing a target-dependent control program comprises a step of converting said script file into a target-dependent structure and associating said data structure with target-dependent sub program code.

21. A system according to claim 6, wherein said display program is arranged, in response to said input device, to cause the display on said visual display unit of expanded information corresponding to a selected portion of said display.

22. A system according to claim 21, wherein said expanded information comprises a textual display of data corresponding to the contents of said control program data store.

23. A system according to claim 21, wherein said expanded information comprises an expanded display of component sub programs.

24. A system according to claim 6, wherein the target apparatus is an automatic teller machine (ATM).

25. A system according to claim 24, wherein said sub programs are selected from a set comprising card reader, visual displayer, data entry, communications, security, data manipulation, and timer sub programs.

26. A system for generating a control program for a target apparatus, said system comprising:

a processor;

a visual display unit;

an input device;

a control program data store; and a program store including:
  (i) an editor program for controlling said processor to accept input from said input device to modify the contents of said control program data store;
  (ii) a display program for controlling said processor to display a graphical representation of the contents of said control program data store on said visual display unit;
  (iii) a compiler program for generating the control program from the contents of said control program data store; and
  (iv) a simulator program arranged, in response to the contents of said control program data store, to cause said processor to simulate the action of the target apparatus under control of the control program.

27. A method of generating a control program for use in a target apparatus, the method comprising the steps of:

providing a visual interface representing (i) subimages which represent control processes which are grouped to represent a plurality of processes to be concurrently executed and (ii) links between the subimages to represent control flow from one group of concurrent processes to a successively performed group of concurrent processes; and editing the subimages and the links between the subimages to generate the control program for use in the target apparatus.

28. A method according to claim 27, wherein the target apparatus is an automatic teller machine (ATM).

29. A method of generating a control program for a target apparatus, the method comprising the steps of:

accepting input from an input device to modify the contents of a control program data store;

displaying a graphical representation of the contents of the control program data store on a visual display unit;

generating the control program from the contents of the control program data store;

storing control program data defining groups of sub programs for simultaneous execution on the target apparatus and control flow data defining a sequence of execution of the groups; and generating a display graphically representing the sub programs so as to indicate the groups, and control flows corresponding to the control flow data between the groups.

30. A method according to claim 29, further comprising the steps of (i) storing catalogue sub program data defining a plurality of catalogue sub programs, and (ii) loading selected catalogue sub program data into the control program data store.

31. A method according to claim 30, further comprising the step of generating a catalogue display on the visual display unit displaying an indication of the catalogue sub programs.

32. A method according to claim 29, further comprising the steps of (i) storing, for each sub program, a sub program record comprising attribute data defining the operation of the sub program, and reference data associating the sub program record with sub program code for executing the sub program in accordance with the attribute data, and (ii) controllably editing the attribute data.

33. A method according to claim 32, further comprising the step of storing the sub program code.

34. A method according to claim 29, further comprising the step of simulating the action of the target apparatus under control of the control program in response to the contents of the control program data store.

35. A method according to claim 29, wherein the target apparatus is an automatic teller machine (ATM).

36. A method according to claim 35, wherein the sub programs are selected from a set comprising card reader, visual displayer, data entry, communications, security, data manipulation, and timer sub programs.

37. A method of generating a control program for a target apparatus, the method comprising the steps of:

accepting input from an input device to modify the contents of a control program data store;

displaying a graphical representation of the contents of the control program data store on a visual display unit;

generating the control program from the contents of the control program data store; and simulating the action of the target apparatus under control of the control program in response to the contents of the control program data store.

* * * * *